April 20, 1954     E. G. HUMPAL     2,676,055
WINDOW ASSEMBLY AND WEATHER STRIP THEREFOR
Filed March 31, 1952
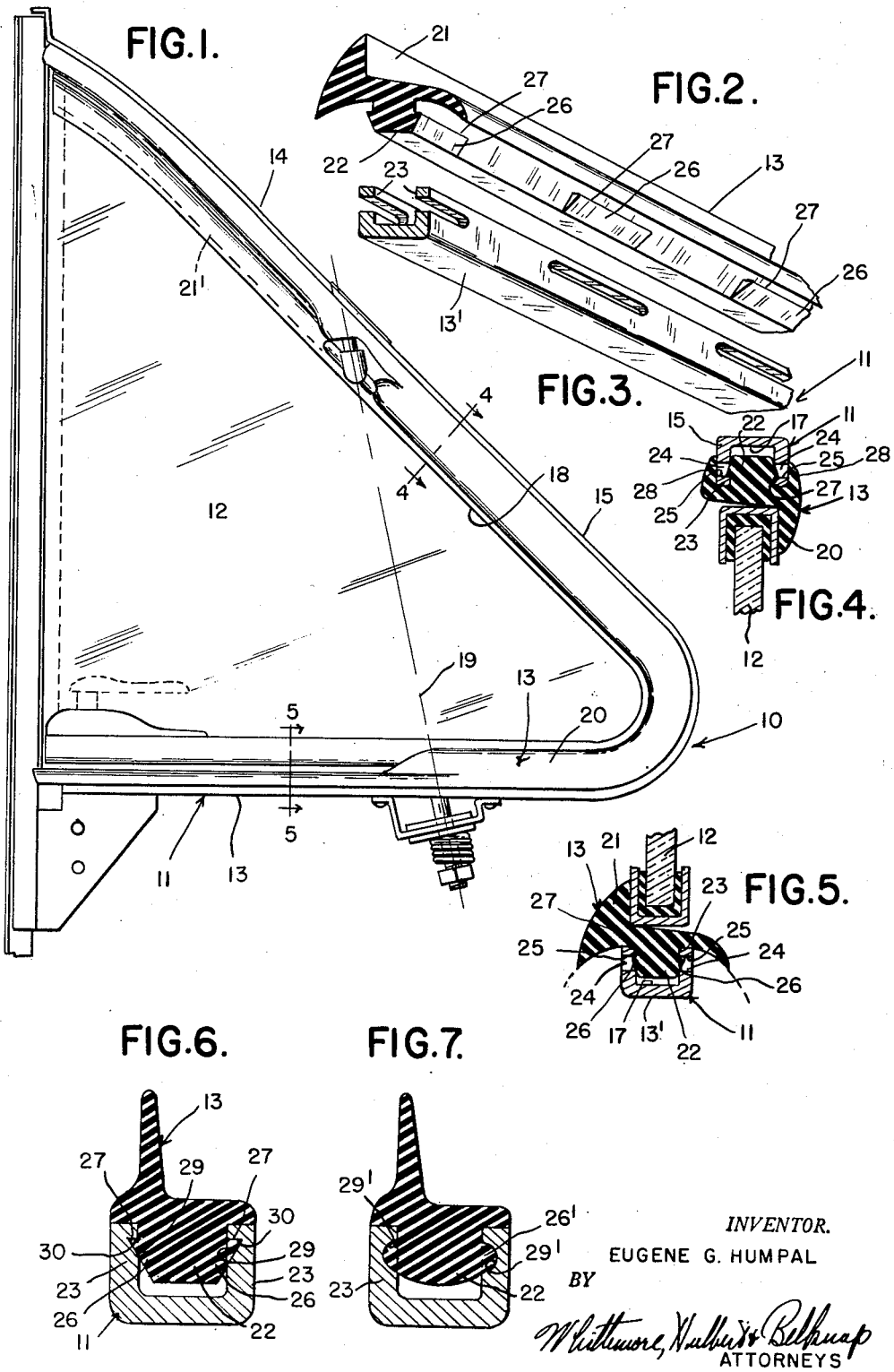
INVENTOR.
EUGENE G. HUMPAL Patented Apr. 20, 1954

2,676,055

UNITED STATES PATENT OFFICE 2,676,055

WINDOW ASSEMBLY AND WEATHER STRIP THEREFOR

Eugene G. Humpal, Royal Oak, Mich., assignor to Motor Products Corporation, Detroit, Mich., a corporation of New York Application March 31, 1952, Serial No. 279,520

10 Claims. (Cl. 296—44)

This invention relates to window assemblies, and refers more particularly to improved weather sealing means for window assemblies.

One type of window assembly used in connection with vehicle bodies comprises a frame and a ventilator panel supported within the frame for swinging movement about an axis extending between opposite side edges of the panel. The space between the ventilator panel and frame is usually sealed in the closed position of the panel by a weather strip of resilient material having laterally offset lips located to respectively engage opposite sides of the ventilator panel and arranged to provide a continuous seal around the portions of the panel enclosed by the frame without interfering with swinging movement of the panel. Also in accordance with conventional practice the frame has channel-shaped bars arranged with the channels opening inwardly with respect to the panel and the weather strip has a head which projects into the channels.

In many types of vehicle bodies the ventilator frame is concealed by the surrounding body structure, and may be made of inexpensive sheet metal. The flanges of the sheet metal frame bars are usually flared laterally inwardly with respect to the channels to tightly grip the head on the weather strip and thereby secure the same in place. However, in some types of vehicle bodies, the ventilator window frame or a part thereof is not concealed by the body frame structure and is visible. In such instances it has been the practice to substitute a die cast frame bright metal for the usual sheet metal construction.

When resorting to die cast frames, some means must be provided for holding the weather strip in assembled relation to the frame as it is not practical to die cast a channel-shaped frame having inwardly sloping side walls to grip the head of the weather strip. With this in view it is an object of this invention to securely hold the weather strip in assembled relation to the frame without resorting to cement, rivets or similar fasteners.

In accordance with this invention, the head on the weather strip may be installed on the frame in the usual way by inserting the head into the channel from the open side of the latter; and ribs are provided at opposite sides of the head in positions to, in effect, snap into recesses formed in the adjacent surfaces of the flanges of the channel. Thus the weather strip is not only securely held in place in the frame, but in addition, may be removed and replaced if required.

The foregoing as well as other objects will be made more apparent as this description proceeds, especially when considered in connection with the accompanying drawing, wherein:

Figure 1 is an elevational view of the outer side of a ventilator window embodying the features of this invention;

Figure 2 is a fragmentary perspective view of the weather strip shown in Figure 1;

Figure 3 is a fragmentary perspective view of the ventilator frame to which the weather strip is attached;

Figure 4 is a sectional view taken on the line 4—4 of Figure 1;

Figure 5 is a sectional view taken on the line 5—5 of Figure 1;

Figure 6 is a cross sectional view showing a modified form of construction; and

Figure 7 is a cross sectional view showing still another embodiment of the invention.

In Figure 1 of the drawing I have shown a ventilator window assembly 10 of the general type employed on vehicle bodies. The assembly 10 comprises a frame 11, a ventilator panel 12 and a weather strip 13. The frame 11 has a bottom bar 13', a top bar 14 and a front bar 15. The top bar 14 is inclined in a downward direction from the rear side of the ventilator frame 11, and is integrally connected to the front bar 15. The front bar 15 forms a continuation of the top bar 14 and is integrally connected to the front end of the bottom bar 13'. The frame bars are channel-shaped in cross section, and the channel 17 opens inwardly with respect to the frame 11.

The ventilator panel 12 is located within the opening 18 defined by the frame 11, and is supported for swinging movement between open and closed positions about an axis 19. The axis 19 extends generally vertically and is located between the front and rear edges of the panel 12. The arrangement is such that the portion of the panel 12 in advance of the axis 19 swings inwardly with respect to the frame, and the portion of the panel 12 in rear of the axis 19 swings outwardly with respect to the frame 11. The specific construction of the pivotal mounting for the ventilator panel 12 on the frame 11 forms no part of the present invention, and is not described in detail herein.

The weather strip 13 seals the space between the frame bars and adjacent edges of the ventilator panel 12 when the latter is in its closed position. This weather strip is formed of a resilient material, such for example as rubber; and is coextensive with the bars of the frame 11. In accordance with conventional practice the weather strip 13 has a lip 20 which projects inwardly with respect to the frame 11, and engages the outer surface of the ventilator panel 12 projecting forwardly from the axis 19. The weather strip 13 has additional lips 21 and 21' offset laterally inwardly from the lip 20 and positioned to respectively engage the inner sides of the top and bottom frame bars extending rearwardly from the axis 19 of pivotal movement of the panel. Thus when the ventilator panel 12 is in its closed position, an effective weather-tight seal is provided between the frame bars and adjacent edges of the panel 12.

In addition the weather strip 13 is fashioned with a head 22, which extends into the channel 17 of the frame 11, and is coextensive with this channel. The width of the head 22 is such as to completely fill the space between the flanges 23 of the channel 17, and is predetermined to permit forcing the head 22 into the channel 17 through the open inner side of the channel. Thus the opposite sides of the head 22 on the weather strip 13 frictionally contact the adjacent surfaces of the flanges 23 throughout the extent of the latter.

While the frictional contact noted above assists in holding the weatherstrip 13 in assembled relation to the frame 11, nevertheless, additional securing means has been found necessary to prevent accidental disengagement of the weather strip 13 from the frame 11. This is accomplished in the present instance by providing interengaging portions on the head 22 and adjacent portions of the frame 11. In the embodiment of the invention shown in Figures 1 to 5 inclusive, the flanges 23 of the frame 11 are fashioned with slots 24 spaced from each other lengthwise of the frame bars and providing shoulders 25.

The head 22 on the weather strip 13 has integral ribs 26 projecting laterally outwardly from opposite sides, and positioned to respectively project into the slots 24 in the flanges 23 of the frame 11. The length of the ribs 26 on the head 22 of the weather strip 13 is somewhat less than the length of the slots 24 in order to facilitate projecting the ribs into the slots during assembly; and the ribs are provided with abrupt shoulders 27, which engage the shoulders 25 to prevent accidental disengagement of the weather strip from the frame 11. However due to the resiliency of the weather strip 13, it is possible to remove this strip from the channel 17 when it is desired to replace the same. Attention is called to the fact that the weather strip 13 has portions 28 at opposite sides which overlie the slotted portions of the flanges 23, and thereby conceal the slots 24 in the assembled position of the parts.

The embodiment shown in Figure 6 differs from the construction previously described in that the inner surfaces of the flanges 23 of the channel-shaped frame 11 have undercut recesses 29 spaced from each other lengthwise of the frame bars. The recesses 29 respectively receive the ribs 26 on the head 22 of the weather strip 13, and the shoulers 27 formed by the ribs 26 respectively engage the abrupt shoulders 30 formed by the undercut recesses 29. In this construction the opposite sides of the weather strip 13 need not be extended along the outer sides of the frame, because the recesses 29 do not extend through the flanges 23 of the frame 11.

The modification shown in Figure 7 is similar to the construction shown in Figure 6. Referring in detail to Figure 7, it will be noted that the head 22' on the weather strip is provided with ribs 26', which are arcuate in cross section, and the recesses 29' in the inner surfaces of the flanges 23 are correspondingly shaped to receive the ribs 26'. This construction may be preferred in some instances because it lends itself more readily to the removal of the weather strip for replacement purposes.

It follows from the above that the weatherstrip for the ventilator panel is securely held in assebled relationship with the channel of the panel frame without the use of cement rivets or similar fastener elements and without the necessity of bending the walls of the channel inwardly. In this respect the invention is particularly desirable for use in connection with ventilator window assemblies where the frame is die cast, although it should be understood that the invention may be used with equal facility regardless of whether the ventilator frame is die cast, formed of sheet metal, or formed by some other method or material.

What I claim as my invention is:

1. In a ventilator window assembly, a frame defining an opening and having bars substantially channel-shaped in cross section arranged with the channels opening inwardly with respect to the opening, a closure for the opening including a panel pivoted to the frame for swinging movement between open and closed positions, weather sealing means between the frame and panel in the closed position of the latter including a strip of resilient material having a head extending into the channel and having portions engageable with the panel in the closed position of the latter, ribs projecting laterally from opposite sides of the head on the weather strip in spaced relation lengthwise of the strip, and the inner surfaces of the flanges of said frame bars having recesses formed therein located to respectively receive said ribs for securely holding said strip in assembled relation to said frame.

2. The ventilator window assembly set forth in claim 1, in which the length of said ribs is somewhat less than the length of said recesses to facilitate assembly.

3. In a ventilator window assembly, a frame defining an opening and having bars substantially channel-shaped in cross section arranged with the channels opening inwardly with respect to the opening, a closure for the opening including a panel pivoted to the frame for swinging movement between open and closed positions, weather sealing means between the frame and panel in the closed position of the latter including a strip of resilient material having a head extending into the channel and having portions engageable with the panel in the closed position of the latter, ribs projecting laterally from opposite sides of the head on the weather strip, the inner surfaces of the flanges of said frame bars having recesses formed therein located to receive said ribs, the portions of said recesses adjacent the free ends of said flanges forming abrupt angles with the inner surfaces of said flanges to provide shoulders, and said ribs having shoulder portions shaped to hook over said shoulders to securely hold the weather strip in assembled relation to said frame.

4. The ventilator window assembly set forth in claim 3, in which said ribs on opposite sides of the head of the weather strip are arranged in spaced relation lengthwise of the strip, said recesses are arranged to register with said ribs, and the length of said ribs is somewhat less than the length of the respective recesses to facilitate assembly.

5. The ventilator window assembly set forth in claim 3, in which the opposite side portions of said head beyond said shoulder portions converge toward each other in a direction inwardly of the channel to facilitate assembly.

6. In a ventilator window assembly, a frame defining an opening and having bars substantially channel-shaped in cross section arranged with the channels opening inwardly with respect to the opening, a closure for the opening including a panel pivoted to the frame for swinging movement between open and closed positions, weather sealing means between the frame and panel in the closed position of the latter including a strip of resilient material having a head extending into the channel and having portions engageable with the panel in the closed position of the latter, ribs projecting laterally from opposite sides of the head on the weather strip in spaced relation lengthwise of the strip, the flanges of said frame bars having slots therein respectively positioned to receive said ribs for securely holding said strip in assembled relation to said frame, and said strip having portions on opposite sides of said head positioned to engage the outer sides of said flanges and to overlie said slots.

7. The window assembly set forth in claim 6, in which the walls of said slots adjacent the free ends of said flanges form abrupt angles with the inner surfaces of said flanges to provide shoulders, and in which said ribs have shoulder portions shaped to hook over said shoulders.

8. In a window assembly, a frame member substantially channel-shaped in cross-section and having recesses on the inner surfaces of the flanges thereof spaced from each other lengthwise of said member, and a weather strip of resilient material having a head extending into the channel and having ribs projecting laterally outwardly from opposite sides of the head into said recesses to securely hold said weather strip in assembled relation to said frame member, the length of said ribs being somewhat less than the length of said recesses to facilitate assembly.

9. The window assembly set forth in claim 8, in which the portions of said recesses adjacent the free ends of said flanges form abrupt angles with the inner surfaces of said flanges to provide shoulders, and in which said ribs have shoulder portions shaped to hook over said shoulders.

10. In a window assembly, a frame member substantially channel-shaped in cross-section and having slots formed in the flanges thereof spaced from each other lengthwise of said member, and a weather strip of resilient material having a head extending into the channel and having ribs projecting laterally outwardly from opposite sides of the head into said slots to securely hold said weather strip in assembled relation to said frame member, said weather strip having portions on opposite sides of said head positioned to engage the outer sides of said flanges and to overlie said slots.

References Cited in the file of this patent

UNITED STATES PATENTS

| Number | Name | Date |
| --- | --- | --- |
| 2,236,827 | Mollet | Apr. 1, 1941 |
| 2,262,644 | Mackey | Nov. 11, 1941 |

FOREIGN PATENTS

| Number | Country | Date |
| --- | --- | --- |
| 318,416 | Great Britain | Sept. 5, 1929 |